Figure 21:
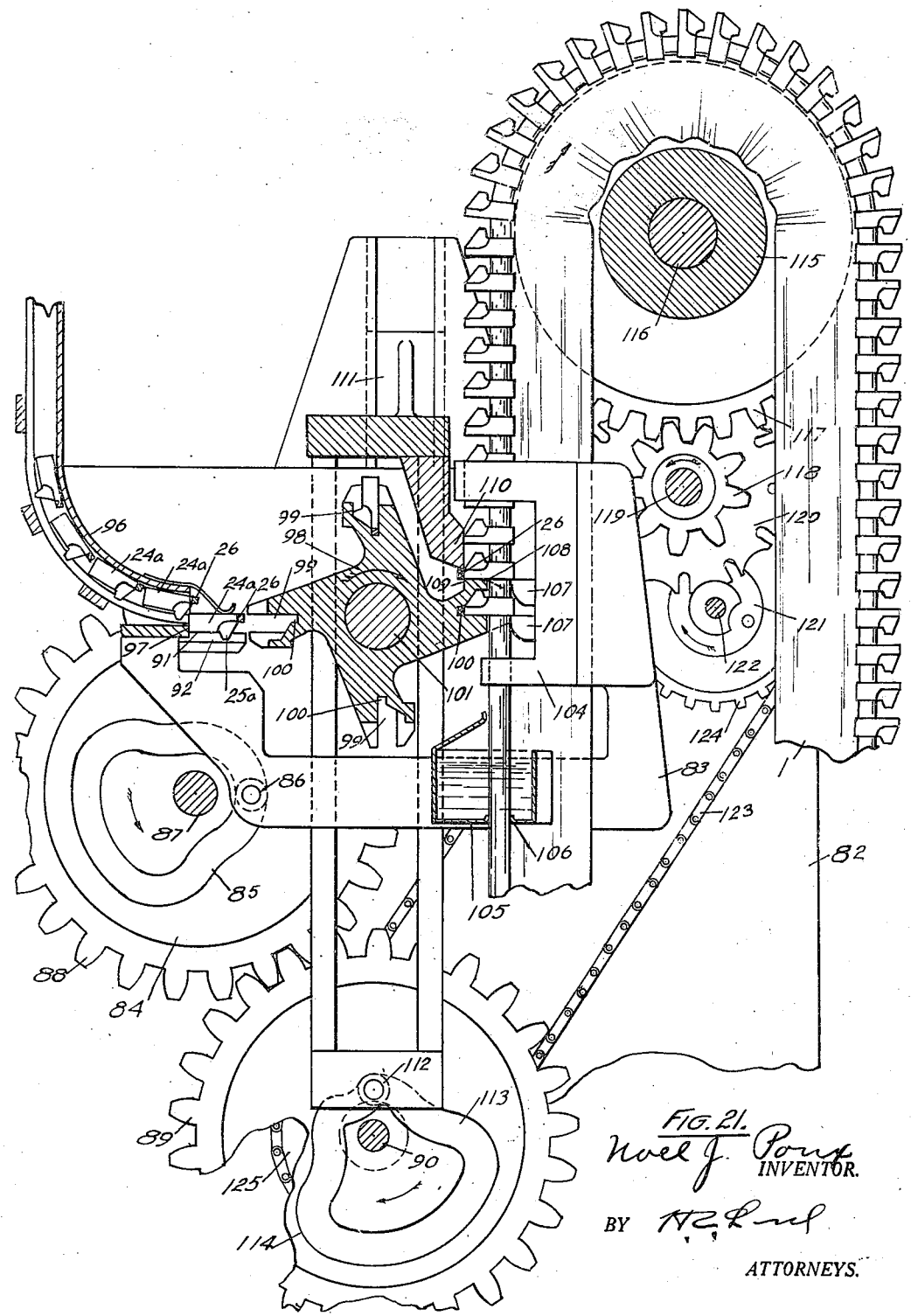

May 28, 1940. N. J. POUX 2,202,230
METHOD OF FORMING SEPARABLE FASTENERS
Original Filed Nov. 20, 1933 4 Sheets-Sheet 1
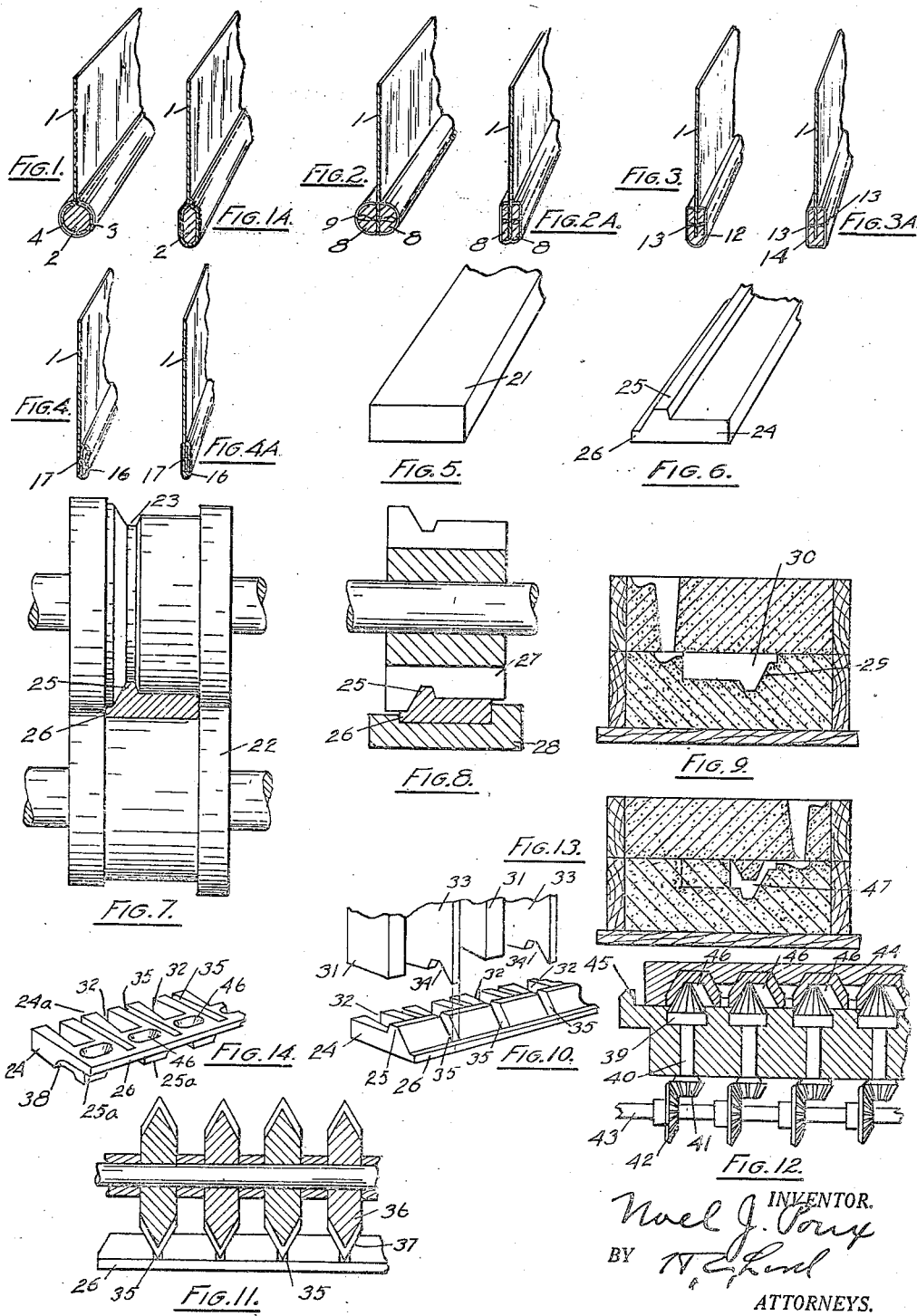

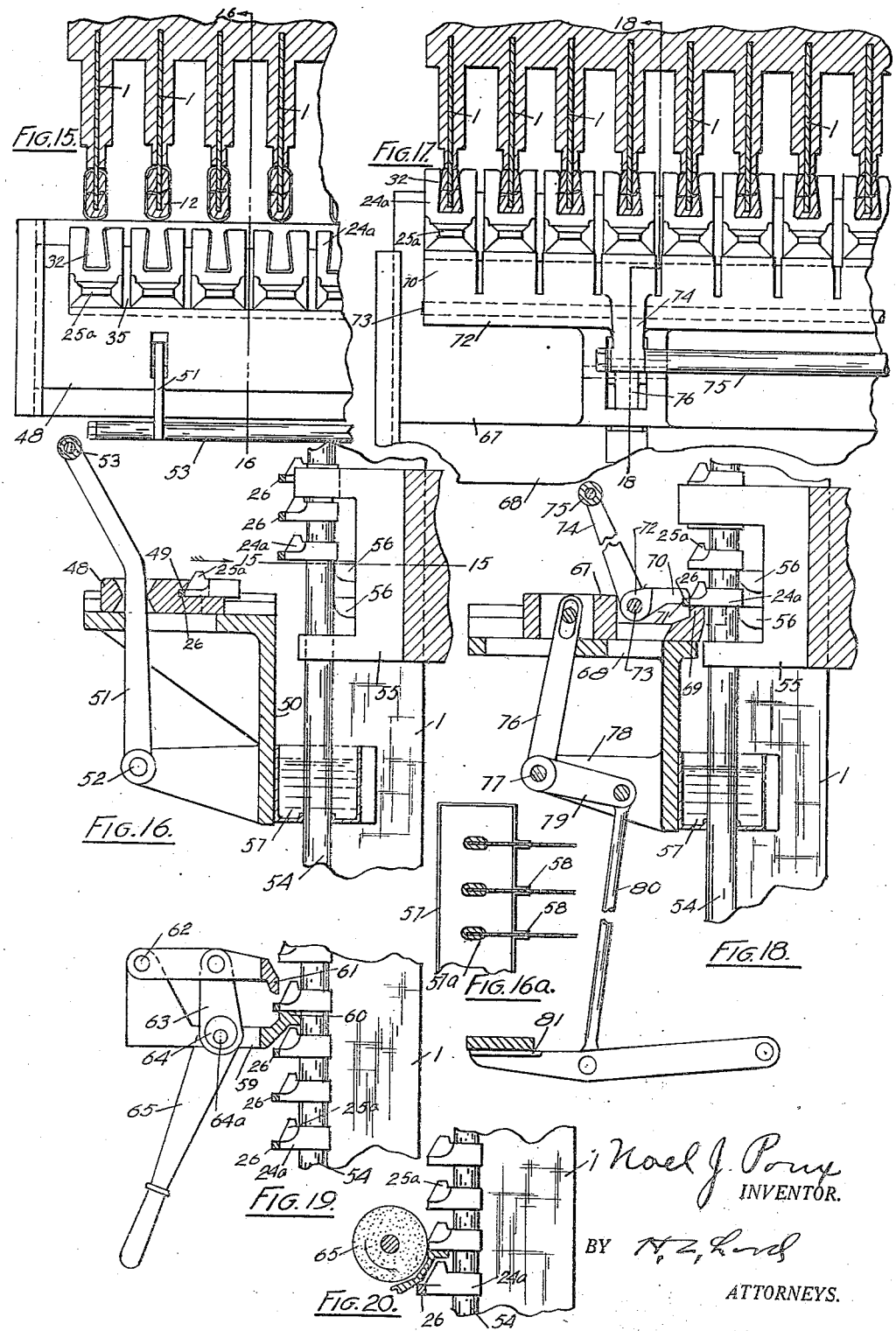
May 28, 1940. N. J. POUX 2,202,230
METHOD OF FORMING SEPARABLE FASTENERS
Original Filed Nov. 20, 1933 4 Sheets-Sheet 2

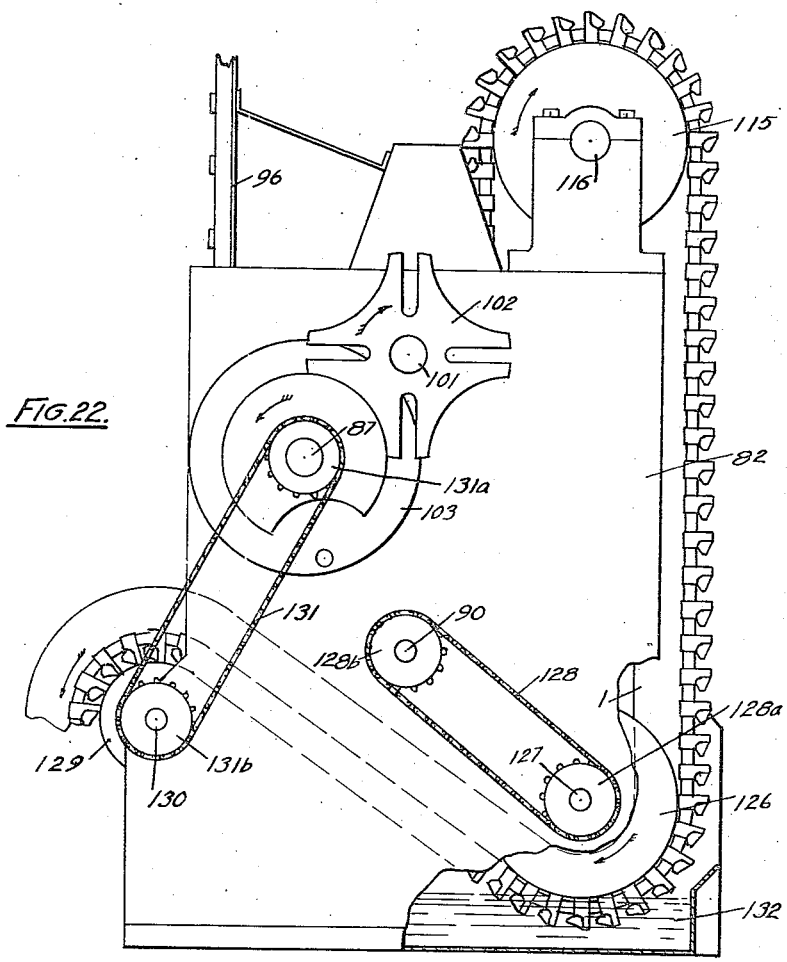

Patented May 28, 1940

2,202,230

UNITED STATES PATENT OFFICE 2,202,230

METHOD OF FORMING SEPARABLE FASTENERS

Noel Joseph Poux, Meadville, Pa., assignor to Talon, Inc., a corporation of Pennsylvania Application November 20, 1933, Serial No. 698,801
Renewed November 3, 1939

10 Claims. (Cl. 18—59)

Separable fasteners, particularly those operated by sliders, have been formed with interlocking members which have been secured in opposing series on stringers. The common method of securing the interlocking members to the stringers has involved clamping jaws which are arranged over beaded edges of the stringers and thus form a positive lock securing the members to the stringers. Other methods of securing the interlocking members have been suggested, but so far as I am informed all of them involve such positive interlocking engagement between the members and the stringers. The present invention involves a manner of securing interlocking members to stringers which permits the practical use of a great variety of materials which are not readily available with the methods heretofore employed in securing the members in place. In carrying out my invention, as an example, I form the interlocking members of Celluloid. I provide the members with jaws into which the ribbed edge, or re-enforced edge of the stringer is compressibly forced, but the jaws are maintained in their original position. Thus it is possible to use material that has no flexibility, or malleability, such as Celluloid and like materials.

The interlocking members may be more definitely secured to the stringers by the use of cement and where Celluloid is used as the material from which the members are formed the cement may be provided by dissolving a portion of the member itself through the action of some solvent, such as acetone. A convenient way of applying the solvent to the engaging surfaces of the jaws is to saturate the stringer with the acetone prior to forcing the jaws into place. A sufficient amount of solvent is thus applied to the surfaces to form the necessary securing cement. Another method is to form a cement by dissolving the Celluloid in acetone and saturating, or coating the tape with this cement prior to applying the interlocking members.

A further feature of the invention is the finishing, or smoothing of the members and this is accomplished by the application of acetone to the surfaces of the members preferably after they are secured to the tape, or stringer. A sufficient amount of the solvent operates to round off the corners and to give to the members a smoother finish than results in the fabricating of the members.

The invention also contemplates a manner of fabricating the members of materials which permit of their use in the method and manner above described and preferably this is accomplished by forming a plurality of members in a strip, applying them to a plurality of stringers and then severing the members so applied. While this may be accomplished largely through manual operation preferably the operation is carried on in an automatic machine in which the stringers are saturated and fed into position, the members in strips applied to the stringers, and then severed and the finished stringers pass through a bath of acetone, or similar material to smooth the article.

The invention also contemplates as instances of the methods and product described a preferable plan of forming the interlocking members. Further features and details of the invention will appear from the specification and claims. Reference is hereby made to my divisional application, Serial No. 301,852, filed October 28, 1939.

Preferred embodiments of the invention are illustrated in the accompanying drawings as follows:

Figs. 1, 1a, 2, 2a, 3, 3a, 4, and 4a show types of stringers available for securing the interlocking members, each of the stringers being provided with a rib, or re-enforcement along the attaching edge.

Fig. 5 is a perspective view of bar stock from which the interlocking members are formed.

Fig. 6 a perspective view of a bar after it is formed into a strip.

Fig. 7 an elevation showing a rolling method of forming the bar shown in Fig. 6.

Fig. 8 a cutting method of forming the bar shown in Fig. 6.

Fig. 9 a molding method of forming the bar shown in Fig. 6.

Fig. 10 a perspective view showing a punching operation on a bar as shown in Fig. 6 to form the jaws and partially separate the members.

Fig. 11 a sectional view showing mechanism and method of forming inclined sides on the interlocking members.

Fig. 12 a sectional view showing a manner of machining recesses on the interlocking members.

Fig. 13 an alternative form in which the interlocking members in strips are formed by molding.

Fig. 14 a perspective view of a completed locking member strip.

Fig. 15 shows a plan view of a machine crowding the ribbed edges of the stringers into slots formed by the jaws.

Fig. 16 a side elevation, partly in section, of said machine.

Fig. 16a a plan view of the tape saturating tank.

Fig. 17 a plan view of an alternative form of machine.

Fig. 18 an elevation, partly in section, of a machine for compressibly forcing the stringers into the slots between the jaws and for separating the strips of interlocking members.

Fig. 19 a manner of separating the strips when placed on the stringers, as for instance, in the machine shown in Fig. 16.

Fig. 20 an elevation showing an alternative method and apparatus for severing the interlocking members on the strips.

Fig. 21 a vertical section of an automatic machine for placing the interlocking members on the tape, or stringers.

Fig. 22 an end elevation of this machine.

The stringers each are formed with a tape 1. In the variation shown in Figs. 1 and 1a a single cord 2 is woven into a tape pocket 3. It may be coated with a cement 4, as for instance, a cement formed by Celluloid dissolved in acetone. The cord is flattened to a comparatively flat shape, as shown in Fig. 1a preliminary to, or as it is crowded between the jaws of the interlocking members, as hereinafter described.

In the structure shown in Figs. 2 and 2a cords 8 are secured by stitching on each side and along the edge of the tape 1. Again these cords are coated with a cement 9 and are flattened, as shown in Fig. 2a, so as to compress them and give them their final shape.

In Figs. 3 and 3a a rib along the stringer 1 is formed by a fold, or fabric 12 which is folded around the edge of the stringer and secured by a stitching 13. This again is compressed, as shown in Fig. 3a, and coated with a cement coating 14.

In the structure shown in Figs. 4 and 4a a rib 16 is formed by folding the tape upon itself and securing the same by a stitching 17. These folds are flattened to approximately their final shape, as shown in Fig. 4a.

21 marks an ordinary bar of material. This in the broader phases may be either metal, Celluloid, Bakelite, or similar material, but preferably in carrying forward the method Celluloid. The bar 21, when the members are formed of material that can be readily molded, may be fabricated into a strip of the form shown in Fig. 6. One manner of accomplishing this is by means of rolls 22, one of which is provided with grooves 23 which will roll the shape of the bar as finished in Fig. 6 and as so finished it has a projecting rib 25 following the general outline of an interlocking projection. It has a rearward extension from which the jaw portion of the members may be formed and it has a securing strip, or projection 26 extending along its front edge which is utilized in the after fabrication in holding the members together until they are in place after which the strip 26 is removed, thus severing the members. A modified manner of fabricating the strip shown in Fig. 6 may be by cutters, as shown in Fig. 8. Here the cutter 27 shapes the top of the strip and the bar as it is fabricated while being maintained in a suitable holder 28. With some materials it is feasible to mold the strip as shown in Fig. 6 and in Fig. 9 such a mold 29 is shown having a mold cavity 30 into which the material is forced so as to fill the mold to the shape of the strip.

After the strip has been formed it is operated upon in a punch press. Here there are a series of punches 31 which punch out in the portion 24 of the strip slots 32 between the jaws. Intermediate punches 33 are adapted to partially sever the members, one from another, a severing slot 35 completely severing the bar except for the securing projection 26. Preferably these punches conform to the top surface of the strip, as shown in Fig. 6, being notched at 34 to receive the rib 25. In this way a cleaner cut is possible than a straight faced punch.

In the strip shown in Figs. 10 and 14 there are series of fastener members arranged in side by side relation. By "side" of the member we refer to that side which appears at the end of the strip as viewed in Figs. 10 and 14, and the other faces of the elements being designated top and bottom or ends.

After so forming the strip it is put into a milling machine, as shown in Fig. 11, having gangs of cutters 36 which are fed into the slots 35 so as to form an inclined surface at the sides of the projections, the incline extending down along the side faces of the members and terminating at the rear of the projections at 38 (see Fig. 14).

The strips are then arranged in a milling machine shown in Fig. 12 which is provided with a series of inclined cutters 39, each cutter being carried by a spindle 40. The spindles are driven by gears 41 and the gears 41 are driven by gears 42 mounted on a shaft 43. The strip during the cutting is secured by a hold-down and feeding bar 44 which feeds the strip on to the milling cutter so as to start the recess and then feeds the strips sidewise, stops 45 being provided to limit the movement. At the completion of the milling movement which involves a relative movement in an axial direction relative to the cutter and then a side movement recesses 46 are formed which are adapted to receive projections 25a. At the completion of the formation of the recesses the final strip 24a is completed and ready for application to the stringers. With certain material the associated members, as indicated in Fig. 14, may be molded in a molding operation, such a mold being shown in Fig. 13 and having a molding cavity 47 corresponding to the shape of the strip as finished in Fig. 14.

The strip however formed may be forced on a plurality of stringers. A convenient machine for accomplishing this is shown in Figs. 15 and 16. A carrier 48 is slidingly mounted on a frame 50. The carrier has a strip receiving socket 49 and is adapted to be actuated by levers 51 carried by pins 52 mounted on the frame. The levers have an operating rod 53 so that they may be readily moved forward. Stringers 54 are carried through guides 55 and preferably extend to a feeding mechanism advanced as the carrier is operated, such feeding mechanism being omitted in Figs. 15 to 18. Pressure fingers 56 are arranged on the guide spaced above and below a part of the stringer which is about to receive a strip. The stringer is drawn through a bath of acetone. This is accomplished by providing a tank 57 in which there is a bottom slot 57a and a slot 58 in the side wall. The stringer forms a closure with these slots as the stringer is advanced and the ribbed edge of the stringer is saturated with a solvent, such as acetone. As the stringer is advanced the finished strips are forced forward, compressing the ribbed edges of the stringer into the slots 32. The solvent carried by the stringer operating on the material such as Celluloid produces a cement which securely fastens the jaws to the stringer. This solvent as it evaporates leaves this cement with sufficient tenacity to hold the members in place until the solvent is sufficiently dissipated to permit the cement to finally set.

After the strips are thus placed on a plurality of stringers the members may be severed, one from another, in any convenient manner, a method and tool for accomplishing this being shown in Fig. 19 where the strip is severed off the front of the members, thus severing the members of a strip. This tool comprises a frame 59 with a backing and severing blade 60 which is placed under the member. An opposing shear blade 61 is arranged above the strip 26 and is pivoted to the frame at 62. Links 63 are secured to the blade 61 and are mounted on eccentrics 64 carried by a rock shaft 64a. The rock shaft is operated by a lever 65 and as this lever is swung the blade 61 is brought down into shearing relation through the action of the eccentric and thus shears the strip 26 from the members, thus separating them.

Another method is shown in Fig. 20 wherein a grinding wheel 66 of sufficient length is adapted to remove the strip 26 by a grinding operation as the members on the stringers are fed to it.

In Figs. 17 and 18 an alternative manner of handling the member strips and severing the uniting strip 26 is indicated. In this a carrier 67 is slidingly mounted on a frame 68. It has a shear base 69 for the member strips. A shear blade 70 is adapted to operate on the strip 26 and sever it. The shear blade has a notch 71 which acts as a guide and stop for the member strip. The blades 70 project from a bar 72. The bar 72 is mounted on a rod 73 and the rod 73 is operated by levers 74 connected by an operating rod 75. A bell crank lever 76 operates on the carrier 67. This lever is mounted on a pin 77 arranged on a post 78 projecting from the frame. One arm 79 of the bell crank lever is connected by a link 80 with a foot pedal 81.

The tape is saturated and guided into position in the same manner as the structure shown in Fig. 16. The strip is placed on the base 69 and secured thereon by the notched end of the shear blade 70. The operator then depresses the foot pedal and forces the strip on to the beaded edge of the tape. At the completion of this operation the operator, by forcing the lever 74 forward, operates the shear blade 70 and severs the strip 26, thus separating the members on the tape.

In Figs. 21 and 22 I have shown an automatic machine for placing the strips on the tapes and for treating the tape and the finished members. The machine is formed with a frame 82. A carrier 83 is slidingly mounted on this frame. A cam wheel 84 having a cam slot 85 operates through a roller 86 to reciprocate the carrier 83. The cam is mounted on a shaft 87. A gear 88 is fixed on the shaft 87 and meshes with a gear 89 fixed on a shaft 90 and the shaft 90 is driven from some source of power (not shown). A work rest 91 provided with grooves 92 for receiving the projections 25a on the strips 24a is mounted on the carrier 83. The work rest has a stop shoulder 97 at its rear edge which engages the rear of the strip 24a so as to enable it to force the strip forward for engagement with the tape. Strips are fed to the work rest from a guide magazine 96 with each reciprocation of the carrier 83. A work feeding wheel 98 is provided with work receiving sockets 99 and as the carrier 83 is moved forward a strip 24a is moved forward with the work rest and forced into the work receiving socket 99, this being provided with an extension 100 receiving the connecting strip 26 so as to firmly engage the member strip 24a. The wheel is fixed on a shaft 101. The wheel is advanced 90° with each cycle of the machine and after a movement of 180° is brought opposite the tape. In order to make these advances and provide the necessary dwell at the different stations the shaft 101 is driven by a Geneva movement having one member 102 fixed on the shaft 101 and a companion member 103 fixed on the shaft 87 so that with each complete rotation of the shaft 87 which has an equal speed ratio with the drive shaft 90 the feeding wheel is advanced 90° and then retained during a large part of the cycle through the dwell of the Geneva movement. A tape guide 104 is mounted on the carrier 83. This is provided with the proper guiding slots for the tape. A saturating tank 105 is also arranged on the carrier and has a slot 106, the tape extending through the slot 106 in the manner more definitely shown in plan view in Fig. 16a. Pressure fingers 107 are provided in the guide 104 to force the tape forward toward the feeding wheel and into the slots of the strip carried thereby as the carrier 83 is reciprocated toward the rear. After the rib of the stringer is compressibly forced into the slots 32 of the strip the next forward movement of the carrier withdraws the tape and with it the strip so secured. The tape is then advanced by mechanism hereinafter described and on the return movement of the tape the strip last attached is carried forward over a face 108 on the feed wheel. The member strip in the final position projects over the face 108 leaving the uniting strip, or rib 26 beyond a shear face 109. A shear blade 110 is mounted on a reciprocating bar 111 and the bar 111 is slidingly mounted in the frame. The bar is provided with a roller 112 which extends into a cam slot 113 in a cam wheel 114. The cam wheel is fixed on the drive shaft 90. The timing of the cam is such that during the period that the tape is in its forward position the knife, or shear 110 is depressed and severs the uniting strip 26, thus disconnecting the several members as they are secured on the tape.

The tape is carried over a feed wheel 115. This feed wheel may be of any convenient structure so as to engage and advance the tape as it is carried over it. It is fixed on a shaft 116. A gear 117 is also fixed on the shaft and meshes with a gear 118. The gear 118 is carried by a shaft 119. A Geneva movement is provided, one member 120 of which is mounted on the shaft 119. The other member, 121, of this movement is mounted on a shaft 122. The shaft 122 is driven through a sprocket chain 123 operating through a sprocket 124 on the shaft. The chain extends to a sprocket 125 on the drive chain 90. The Geneva movement is provided with sufficient stations so spaced as to advance the tape the distance of one interlocking member with each cycle of the machine. The tapes are carried around a wheel 126. This wheel is mounted on a shaft 127 and the shaft is driven by a sprocket chain 128 operating on a sprocket 128a on the shaft and driven from a sprocket 128b on the shaft 90. The tapes are also carried over the feed rolls 129. These rolls are mounted on a shaft 130 and driven by a chain 131 extending from sprockets 131a on the shaft 87 and operating on a sprocket 131b on the shaft 130. A tank 132 is mounted in the base of the frame and a solvent, such as acetone, is maintained at a level in this tank to immerse the interlocking members on the tape as the tape is advanced. This solvent working on such materials as Celluloid dissolves a sufficient amount of the surface as to smooth the corners and rough edges and give to the surface a polished effect. It will be seen, therefore, that this machine as it is operated automatically takes the united strip from the guide 96 delivers the same to the feed wheel, is carried by the feeding wheel into position to receive the tape and at the tape position the tape is forced compressibly into the slots of the members on the strip, the tape is advanced and the uniting strip severed, thus disconnecting the members on adjacent tape. The tapes so advanced are advanced through the feeding mechanism, step by step. A saturating tank is provided so that the tape as it advances to receive the members is saturated with the solvent forming with the Celluloid a securing cement so that the members as forced into place are at the same time cemented on the stringer. The tapes are advanced so as to immerse the members and thus dissolve the surface to an extent to smooth the corners and the surfaces.

While I have referred to acetone as a desirable solvent I do not wish to be limited, except where definitely expressed as a limitation, to this particular solvent. Amilacetate and glacial-acetic acid are solvents which may be used. These may be used more definitely in forming the cement than in the other uses of acetone, as expressed herein, but there are some objections to these that do not occur in the use of acetone, as for instance, the use of glacial-acetic acid is very injurious to the hands and in some particulars these added solvents are somewhat too rapid in their action to obtain the best results, as for instance, in the final dipping for smoothing up the members.

What I claim as new is:

1. A strip of fastener members for separable fasteners of the class described, each member consisting of means at one end for attachment to a tape, and interlocking means at the other end adapted to interlock with corresponding members, the members being arranged in the strip in side by side relation and integrally united by a continuous rib uniting all of the members, said rib extending along the fronts of the fastener members so that it can be cut away after said members are attached to tapes.

2. The method of forming interlocking members for separable fasteners of the class described, which consists of forming a strip of members each with means for attachment to a tape at one end and interlocking means at the other end, said members being arranged in side by side relation in the strip, said strip including a longitudinally continuous integral rib which projects externally of the members and which joins with an outer surface of each of them, and afterwards severing said rib as a whole to separate the members.

3. The method of forming separable fasteners of the class described, which consists in providing strips of fastener members, the members in the strip being arranged in side by side relation, aligning a series of tapes in parallel relation and spaced apart to conform with the spacing of the members in said strip, alternately attaching a strip of members to said tapes, that is, attaching one member of the strip to each tape, and advancing all of the tapes simultaneously a distance equal to the required steps of the fastener members in a separable fastener stringer, and severing the members at a convenient stage in the process.

4. An article of manufacture, comprising a ribbon-like member having a series of fastener elements disposed along at least one side thereof, characterized by the fact that each element is unitarily connected to said ribbon-like member and provided with tape gripping jaws at one end and an interlocking head at its other end.

5. An article of manufacture, comprising a web or band of suitable material and of indeterminate length having completely shaped fastener elements formed integrally therewith and extending laterally from one edge thereof, each of said elements having tape gripping jaws at one end and an interlocking head at its other, individual elements being obtained by severing the same from the web or band.

6. An article of manufacture, comprising a web or band of suitable material of indeterminate length and having shaped fastener elements each of which has tape gripping jaws at one end and an interlocking head at the other end formed integrally therewith and extending transversely from one edge thereof; the longitudinal axes of said elements being at right angles to the longitudinal axis of the web or band.

7. An article according to claim 4, characterized by the fact that the ends of the jaws of the fastener elements are spaced from the adjacent edge of the ribbon-like member.

8. An article of manufacture, comprising a series of spaced metallic fastener elements each of which has at least partially formed tape gripping jaws at one end and an interlocking head at the other end, and a metallic ribbon-like member formed in one piece with said elements for holding and supporting the same while subsequent operations are performed on said elements.

9. A stock strip comprising substantially completely formed fastener elements each having an interlocking head at one end and tape gripping jaw portions at the other end and a band or ribbon-like portion to which said elements are unitarily connected.

10. A metal stock strip comprising uniformly spaced substantially completely formed fastener elements each having an interlocking head at one end and tape gripping jaw portions at the other end and a band or ribbon-like portion to which said elements are unitarily connected.

NOEL JOSEPH POUX.